United States Patent
Nishikuni et al.

(10) Patent No.: US 10,033,907 B2
(45) Date of Patent: Jul. 24, 2018

(54) IMAGE FORMING APPARATUS, SYSTEM, AND COMPUTER PROGRAM PRODUCT REPLACING IMAGE DATA WITH CORRESPONDING STORED REPLACEMENT IMAGE DATA

(71) Applicant: FUJI XEROX CO., LTD., Tokyo (JP)

(72) Inventors: Yuichi Nishikuni, Kanagawa (JP);
Yoshitaka Kuwada, Kanagawa (JP);
Ryosuke Higashikata, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/206,456

(22) Filed: Jul. 11, 2016

(65) Prior Publication Data

US 2017/0257524 A1 Sep. 7, 2017

(30) Foreign Application Priority Data

Mar. 2, 2016 (JP) .................................. 2016-040493

(51) Int. Cl.
*H04N 1/387* (2006.01)
*H04N 1/32* (2006.01)
(Continued)

(52) U.S. Cl.
CPC ....... *H04N 1/40093* (2013.01); *H04N 1/0083* (2013.01); *H04N 1/00095* (2013.01); *H04N 1/00278* (2013.01); *H04N 1/00795* (2013.01); *H04N 1/04* (2013.01); *H04N 1/2104* (2013.01); *H04N 1/32128* (2013.01); *H04N 1/60* (2013.01); *H04N 1/62* (2013.01); *H04N 1/3871* (2013.01); *H04N 2201/0081* (2013.01); *H04N 2201/0082* (2013.01); *H04N 2201/0087* (2013.01);

(Continued)

(58) Field of Classification Search
None
See application file for complete search history.

(56) References Cited

U.S. PATENT DOCUMENTS

| 2004/0049731 A1* | 3/2004 | Suzuki ................. G06F 17/211 715/243 |
| 2007/0109600 A1* | 5/2007 | Ren ....................... G06K 15/02 358/1.18 |
| 2013/0004061 A1* | 1/2013 | Sakurai ................ G06T 3/4046 382/159 |

FOREIGN PATENT DOCUMENTS

JP 2006-100924 A 4/2006

* cited by examiner

*Primary Examiner* — Scott A Rogers
(74) *Attorney, Agent, or Firm* — Sughrue Mion, PLLC

(57) ABSTRACT

An image forming apparatus includes an image memory, an image receiving unit, an image determination unit, an image search unit, an image forming unit, and an image converter. The image memory stores replacement image data. The image receiving unit receives image data from the outside. The image determination unit determines whether the received-image data includes to-be-replaced image data. The image search unit searches, in a case where it is determined that the received-image data includes the to-be-replaced image data, the image memory for replacement image data corresponding to the to-be-replaced image data. The image forming unit forms an image. The image converter converts, in a case where the corresponding replacement image data is detected, the received-image data into to-be-output image data in which the to-be-replaced image data is replaced with the corresponding replacement image data, and causes an image based on the to-be-output image data to be formed.

20 Claims, 12 Drawing Sheets

(51) Int. Cl.
*H04N 1/40* (2006.01)
*H04N 1/60* (2006.01)
*H04N 1/62* (2006.01)
*H04N 1/21* (2006.01)
*H04N 1/00* (2006.01)
*H04N 1/04* (2006.01)

(52) U.S. Cl.
CPC .............. *H04N 2201/0094* (2013.01); *H04N 2201/3226* (2013.01)

FIG. 3

| ID | HIGH-RESOLUTION TEXTURE |
|---|---|
| 0001 | TEXTURE 1 |
| 0002 | TEXTURE 2 |
| 0003 | TEXTURE 3 |
| ⋮ | ⋮ |

FIG. 11

| LOW-RESOLUTION TEXTURE | HIGH-RESOLUTION TEXTURE |
|---|---|
| TEXTURE 1 | TEXTURE 1 |
| TEXTURE 2 | TEXTURE 2 |
| TEXTURE 3 | TEXTURE 3 |
| ⋮ | ⋮ |

IMAGE FORMING APPARATUS, SYSTEM, AND COMPUTER PROGRAM PRODUCT REPLACING IMAGE DATA WITH CORRESPONDING STORED REPLACEMENT IMAGE DATA

CROSS-REFERENCE TO RELATED APPLICATIONS

This application is based on and claims priority under 35 USC 119 from Japanese Patent Application No. 2016-040493 filed Mar. 2, 2016.

BACKGROUND (i) Technical Field

The present invention relates to an image forming apparatus, an image forming system, and a non-transitory computer readable medium.

(ii) Related Art

An image including for example a document, a figure, or a picture, and furthermore a texture serving as a background image is edited by an image editing apparatus, such as a computer, the resulting image data generated by the editing is transmitted to a device having an image print function such as a printer, and an image based on the image data is printed out on a paper sheet.

Here, the data size of texture data having a resolution aesthetically sufficient for printing out, on a paper sheet, an image based on the texture data is large, and use of such texture data in an editing operation may cause inconveniences such as a slow operation of the image editing apparatus.

SUMMARY

According to an aspect of the invention, there is provided an image forming apparatus including an image memory, an image receiving unit, an image determination unit, an image search unit, an image forming unit, and an image converter. The image memory stores replacement image data representing a replacement image. The image receiving unit receives image data transmitted from the outside. The image determination unit determines whether the received-image data received by the image receiving unit includes to-be-replaced image data representing a to-be-replaced image that needs to be replaced. The image search unit searches, in a case where the image determination unit determines that the received-image data includes the to-be-replaced image data, the replacement image data stored in the image memory for replacement image data corresponding to the to-be-replaced image data. The image forming unit forms, on a paper sheet, an image based on image data. The image converter converts, in a case where the replacement image data corresponding to the to-be-replaced image data included in the received-image data is detected by the image search unit, the received-image data into to-be-output image data in which the to-be-replaced image data is replaced with the replacement image data corresponding to the to-be-replaced image data, and causes the image forming unit to form an image based on the to-be-output image data.

BRIEF DESCRIPTION OF THE DRAWINGS

An exemplary embodiment of the present invention will be described in detail based on the following figures, wherein:

FIG. 3 is a conceptual diagram illustrating a data structure of high-resolution textures stored in an image memory;

FIG. 11 is a conceptual diagram illustrating a data structure of high-resolution textures stored in the image memory according to a first modification.

DETAILED DESCRIPTION

In the following, an exemplary embodiment of the present invention will be described.

Note that all images other than images on paper sheets or documents in the exemplary embodiment described below are treated as images in the form of data. Thus, in the following, even an image in the form of data may be simply referred to as "image" without clearly stating an image in the form of data as in "image data". This similarly applies to a texture and other words within the category of images.

Figure 1:
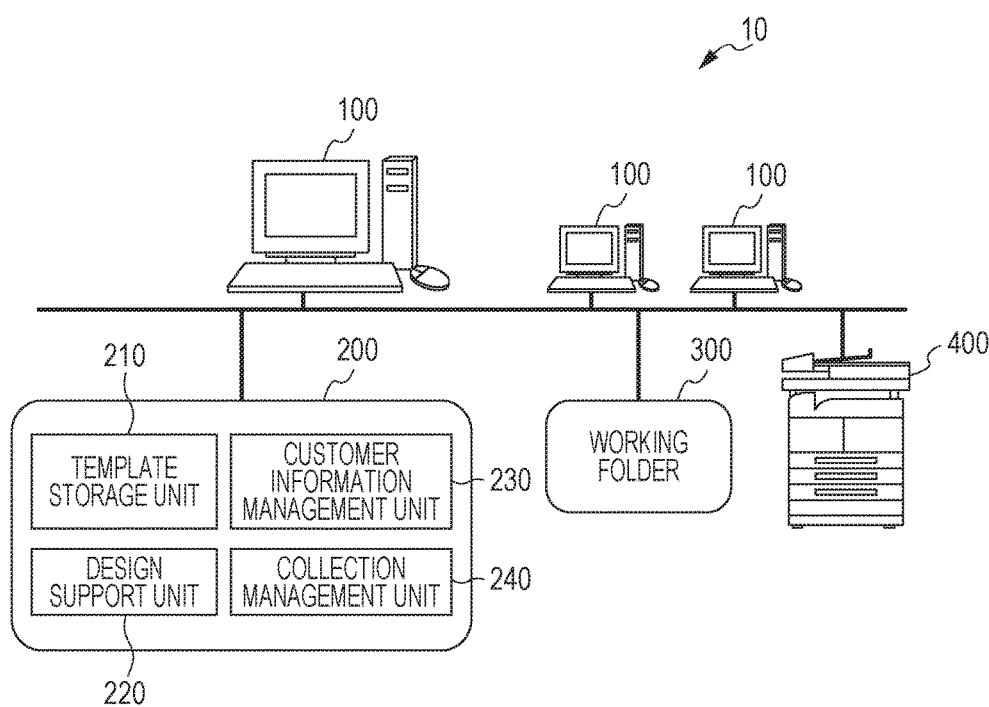
FIG. 1 is a conceptual diagram illustrating the overall configuration of an image handling system.

FIG. 1 is a conceptual diagram illustrating the overall configuration of an image handling system 10. The image handling system 10 illustrated in FIG. 1 corresponds to an image forming system according to the exemplary embodiment of the present invention. The image handling system 10 includes a multifunction machine 400, which is an image forming apparatus according to the exemplary embodiment of the present invention.

The image handling system 10 illustrated in FIG. 1 includes multiple client personal computers (PCs) 100, a sales promotion support system 200, a working folder 300, and the multifunction machine 400, which are connected to each other via a local area network (LAN) 500.

Users edit images at the multiple client PCs 100.

The role of the sales promotion support system 200 in the present exemplary embodiment is to store textures to be used as images such as backgrounds included in edited images, and to support image editing performed at each client PC 100.

The sales promotion support system 200 includes a template storage unit 210, a design support unit 220, a customer information management unit 230, and a collection management unit 240. The template storage unit 210 stores various textures. Note that the textures stored here are images each having a data size appropriate for image editing performed at each client PC 100 and each having a lower resolution than textures stored in the multifunction machine 400, which will be described later. The textures stored in the template storage unit 210 correspond to an example of images to be replaced (to-be-replaced image data) according to the exemplary embodiment of the present invention.

The design support unit 220 provides support for selecting a desired texture from among the various textures stored in the template storage unit 210. Specifically, when "classic impression", "clear and fresh impression", or the like is specified by a client PC 100 among the client PCs 100, textures that match the impression are selected from among the various textures stored in the template storage unit 210, and a list of the textures is presented to the client PC 100. In addition, similarly to this, when a season "spring" is specified, a list of textures that makes a user think of spring is presented. At the client PC 100, a desired texture is selected from the presented list. Thereafter, the selected texture is read out from the template storage unit 210, and transmitted to the client PC 100. At the client PC 100, the texture transmitted from the template storage unit 210 is treated as one of element images, and an image including the texture is edited.

The customer information management unit 230 stores customer information including customers' addresses, names, genders, ages, and the like. The customer information stored in the customer information management unit 230 is used when, for example, a list of addresses and names of customers of a specific age bracket, a specific gender, or the like is read out and printed on front surfaces of postcards, an image edited by the client PC 100 is printed on the back of the postcards, and the post cards are mailed to the customers.

In addition, the collection management unit 240 stores questionnaire results from customers and event attendance information or the like about the customers. The information stored in the collection management unit 240 is used when customers to whom mail is to be addressed are selected or a texture matching the selected customers is selected.

In addition, the working folder 300 stores images and information shared by the multiple client PCs 100. For example, an image edited by a certain client PC 100 among the multiple client PCs 100 is stored in the working folder 300. The working folder 300 is used such that the stored image is read out and edited again by another client PC 100 among the multiple client PCs 100. Specifically, for example, in the case where an event is to be held in Osaka, the working folder 300 is used such that images stored in the working folder 300 and included in a promotional document of a similar event performed in Tokyo are read out, and edited and used so as to be appropriate for the event to be held in Osaka.

In addition, the working folder 300 temporarily stores textures for image editing, the textures having been generated by the client PCs 100 and the multifunction machine 400, which will be described later, and transmitted to the working folder 300. The sales promotion support system 200 periodically monitors the working folder 300, and when a new texture is stored there, the sales promotion support system 200 reads out the new texture and stores the new texture in the template storage unit 210. The newly stored texture is automatically associated with the "classic impression", a season "spring" described above, or the like. Alternatively, such association is performed by a user using a certain client PC 100 among the multiple client PCs 100.

The multifunction machine 400 corresponds to an example of an image forming apparatus according to the exemplary embodiment of the present invention as described above. The multifunction machine 400 has, for example, a communication function through which communication is performed via the LAN 500, a scanner function through which image data is generated by reading an image drawn on a document or the like, and a print function through which an image is printed out on a paper sheet.

Figure 2:
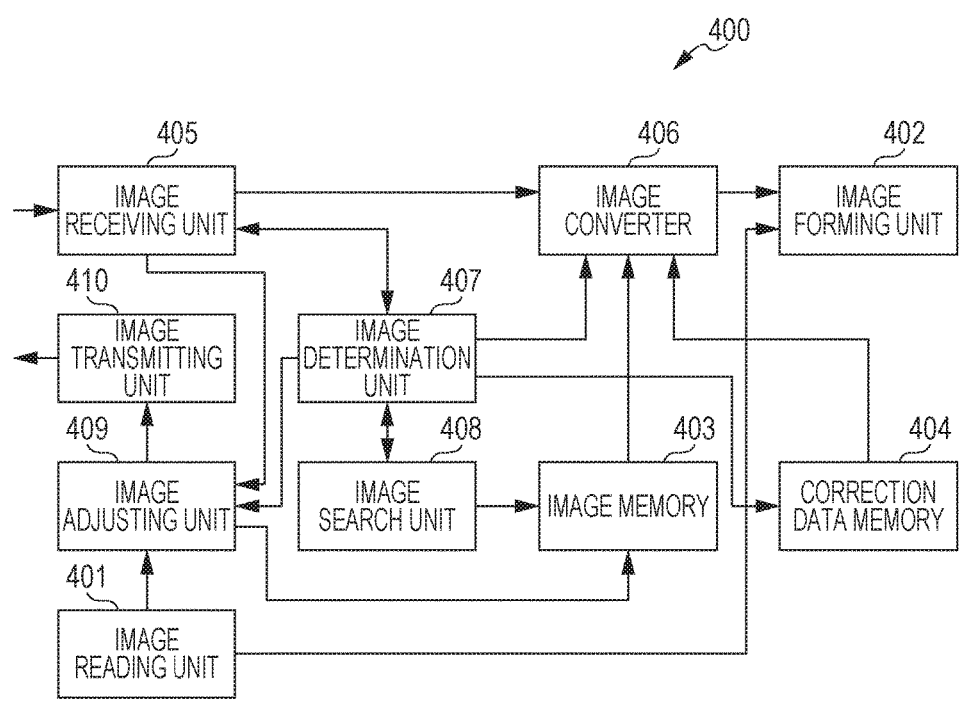
FIG. 2 is a functional block diagram illustrating a multifunction machine the exterior of which is illustrated in FIG. 1.

FIG. 2 is a functional block diagram illustrating the multifunction machine 400 the exterior of which is illustrated in FIG. 1.

The multifunction machine 400 has an arithmetic processing function realized by a central processing unit (CPU), a memory, and the like therein that execute programs. The functions of the multifunction machine 400, which will be described with reference to FIG. 2, are realized by a combination of the hardware of the multifunction machine 400 and programs executed in the multifunction machine 400. An example of a specific operation of the multifunction machine 400 will be described later. Here, the functions of the multifunction machine 400 is first conceptually described.

The multifunction machine 400 includes an image reading unit 401 and an image forming unit 402. The image reading unit 401 represents a scanner function of the multifunction machine 400, and generates image data by reading an image from a document or the like. The image forming unit 402 represents a print function of the multifunction machine 400, and prints out, on a paper sheet, an image based on image data. When a copy image of a document is printed out, the image data acquired by the image reading unit 401 reading the document is transmitted to the image forming unit 402, and the image forming unit 402 prints out the same image as an image of the document.

In addition, the multifunction machine 400 includes an image memory 403. The image memory 403 stores high-resolution textures for printing out. The image memory 403 may prestore typical textures for printing out before shipment of the multifunction machine 400. In the case of the present exemplary embodiment, the image memory 403 may store textures after shipment of the multifunction machine 400 regardless of whether textures are prestored before shipment. The textures stored in the image memory 403 correspond to an example of replacement images (replacement image data) according to the exemplary embodiment of the present invention.

When an image transmitted from a client PC 100 among the client PCs 100 (see FIG. 1) to the multifunction machine 400 includes a low-resolution texture, the low-resolution texture is replaced with a high-resolution texture stored in the image memory 403. Details of such replacement will be described later. The image forming unit 402 prints out, on a paper sheet, an image based on the image data acquired as a result of this replacement.

In addition, the multifunction machine 400 includes a correction data memory 404. The correction data memory 404 stores color correction data for correcting tinges of images and transparency level correction data for correcting transparency levels of images. The color correction data and the transparency level correction data are data for correcting tinges and a transparency level due to the characteristics unique to the multifunction machine 400. Each image transmitted from the client PCs 100 (see FIG. 1) to the multifunction machine 400 includes image data representing the image itself and attachment data representing attachment information specifying colors, a transparency level, and the like. When an image is transmitted from a client PC 100 among the multiple client PCs 100 (see FIG. 1) to the multifunction machine 400, the multifunction machine 400 corrects, by using the color correction data and transparency level correction data stored in the correction data memory 404, color specification data and transparency level specification data included in the attachment data of the image. The image forming unit 402 prints out, on a paper sheet, an image based on the image data acquired as a result of this correction.

In addition, the multifunction machine 400 includes an image receiving unit 405, an image converter 406, an image determination unit 407, and an image search unit 408.

The image receiving unit 405 receives an image transmitted from the outside of the multifunction machine 400 (any of the client PCs 100 in the example illustrated in FIG. 1). This received image is transmitted to the image converter 406 for printing out. In addition, the attachment information included in the received image is also transmitted to the image determination unit 407.

The image determination unit 407 determines whether the received image received by the image receiving unit 405 includes a low-resolution texture for which replacement is instructed.

In the case where it is determined that the received image received by the image receiving unit 405 includes a low-resolution texture for which replacement is instructed, the image search unit 408 searches the high-resolution textures stored in the image memory 403 for a high-resolution texture corresponding to the low-resolution texture present in the received image.

When the image search unit 408 detects a high-resolution texture corresponding to the low-resolution texture included in the received image, the corresponding high-resolution texture is read out from the image memory 403 and transmitted to the image converter 406. In addition, the image determination unit 407 notifies the image converter 406 that the low-resolution texture that needs to be replaced needs to be replaced with the high-resolution texture corresponding to the low-resolution texture. Thereafter, the image converter 406 replaces, with the high-resolution texture read out from the image memory 403, the low-resolution texture that needs to be replaced and that is included in the received image received from the image receiving unit 405, and converts the resulting received-image data into to-be-output image data for printing out performed by the image forming unit 402.

The to-be-output image data generated on the basis of the resulting received-image data is transmitted to the image forming unit 402, and the image forming unit 402 prints out, on a paper sheet, an image including the high-resolution texture.

The multifunction machine 400 according to the present exemplary embodiment also performs, for colors and transparency levels of images, processing similar to that described above.

As described above, the received image at the image receiving unit 405 is transmitted to the image converter 406, and the attachment information included in the received image is also transmitted to the image determination unit 407.

When the image determination unit 407 determines that the attachment information includes color specification or transparency level specification, the color correction data or the transparency level correction data is read out from the correction data memory 404 and transmitted to the image converter 406. In addition, the image determination unit 407 instructs the image converter 406 to correct the colors or transparency level of the received image on the basis of the color correction data or transparency level correction data transmitted from the correction data memory 404.

In accordance with this instruction, the image converter 406 corrects the color specification data or transparency level specification data received from the image receiving unit 405, and converts the resulting received-image data into to-be-output image data including information regarding the corrected colors or information regarding the corrected transparency level. The image forming unit 402 receives the to-be-output image data including the information regarding the corrected colors or the image regarding the corrected transparency level, and prints out, on a paper sheet, an image based on the to-be-output image data. The image printed out on this paper sheet is an image that is acquired by correcting colors or a transparency level due to the characteristics (idiosyncrasies) unique to the multifunction machine 400 and that has colors and a transparency level desired by a user who have performed image editing using a client PC 100 among the multiple client PCs 100.

Next, the case where the image memory 403 is caused to store a new high-resolution texture will be described.

In the multifunction machine 400 according to the present exemplary embodiment, two methods are prepared as methods for causing the image memory 403 to store high-resolution textures: a method for generating a texture using the image reading unit 401 included in the multifunction machine 400, and storing the generated texture in the image memory 403; and a method for receiving, using the image receiving unit 405, a texture transmitted from the outside (a client PC 100 among the multiple client PCs 100 in the example described here), and storing the received texture in the image memory 403.

First, the method for generating a texture using the image reading unit 401 will be described.

Here, when for example a texture serving as hardware, such as a document on which the texture is drawn, or a certain cloth when the feel of the certain cloth is used as a texture is read by the image reading unit 401, and a texture serving as image data is generated. The texture generated as image data here is a high-resolution texture appropriate for printing out.

The multifunction machine 400 further includes an image adjusting unit 409 and an image transmitting unit 410. The texture generated through reading performed by the image reading unit 401 is input to the image adjusting unit 409. The image adjusting unit 409 generates a low-resolution texture appropriate for editing by reducing the pixels of the received high-resolution texture, and assigns, to both of the high-resolution texture and the low-resolution texture, a unique ID that is common to the high-resolution texture and the low-resolution texture and distinguishable from other textures. The high-resolution texture is associated with the ID and stored in the image memory 403. In contrast, the low-resolution texture is associated with the same ID and transmitted to the image transmitting unit 410. The image transmitting unit 410 transmits the low-resolution texture with the ID toward the working folder 300 illustrated in FIG. 1. As described above, the sales promotion support system 200 periodically monitors the working folder 300, and when the working folder 300 has a new texture, the sales promotion support system 200 stores the new texture in the template storage unit 210. In this manner, the texture for editing and the texture for printing out that are associated with each other by the same ID are stored in the template storage unit 210 of the sales promotion support system 200 and the image memory 403 of the multifunction machine 400, respectively.

Note that the image adjusting unit 409 corresponds to an example of an image generation unit according to the exemplary embodiment of the present invention, the image generation unit generating to-be-replaced image data.

Next, the case where a high-resolution texture is transmitted from the client PC 100 will be described.

The transmitted high-resolution texture is received by the image receiving unit 405. The high-resolution texture includes an image representing the texture itself and attachment information. The attachment information is transmitted to the image determination unit 407. The attachment information includes information indicating that this received image is a texture that needs to be stored in the image memory 403. The image determination unit 407 determines, with reference to the information, that this received image is a texture that needs to be stored in the image memory 403. In accordance with the determination, the image receiving unit 405 then transmits the present received image to the image adjusting unit 409. The image adjusting unit 409 generates a low-resolution texture by performing reduction processing on the received image received from the image receiving unit 405 when a low-resolution texture needs to be generated in accordance with the instructions given by the image determination unit 407. In addition, when an ID for associating the high-resolution texture with the low-resolution texture has not yet been assigned to the present received image and the ID needs to be newly assigned also in accordance with the instructions given by the image determination unit 407, the image adjusting unit 409 assigns a new ID to the high-resolution and low-resolution textures. The image adjusting unit 409 then stores the high-resolution texture together with the ID in the image memory 403. In contrast, the low-resolution texture is transmitted together with the ID from the image transmitting unit 410 and stored in the template storage unit 210 of the sales promotion support system 200 via the working folder 300 (see FIG. 1).

The image adjusting unit 409 according to the present exemplary embodiment corresponds to an example of the image generation unit according to the exemplary embodiment of the present invention as described above and also corresponds to an example of an image storage unit that stores replacement image data in an image memory.

In the case where a high-resolution texture has been generated and a corresponding low-resolution texture has also been generated in a client PC 100 among the multiple client PCs 100 illustrated in FIG. 1, the image adjusting unit 409 does not generate a low-resolution texture. The low-resolution texture generated by the client PC 100 is transmitted from the client PC 100 to the working folder 300, and stored in the template storage unit 210 of the sales promotion support system 200 via the working folder 300. In the case where an ID has already been assigned to the high-resolution texture received by the image receiving unit 405, the ID is used as is, and the image adjusting unit 409 does not assign a new ID.

New high-resolution textures are stored in the image memory 403 using the above-described two methods. In addition, the high-resolution textures stored in the image memory 403 may be deleted by operating a user interface (UI), not illustrated, of the multifunction machine 400.

Next, an example of an operation of the multifunction machine 400 will be described.

FIG. 3 is a conceptual diagram illustrating a data structure of the high-resolution textures stored in the image memory 403.

The image memory 403 stores, as illustrated in FIG. 3, many high-resolution textures associated with respective IDs.

Figure 4:
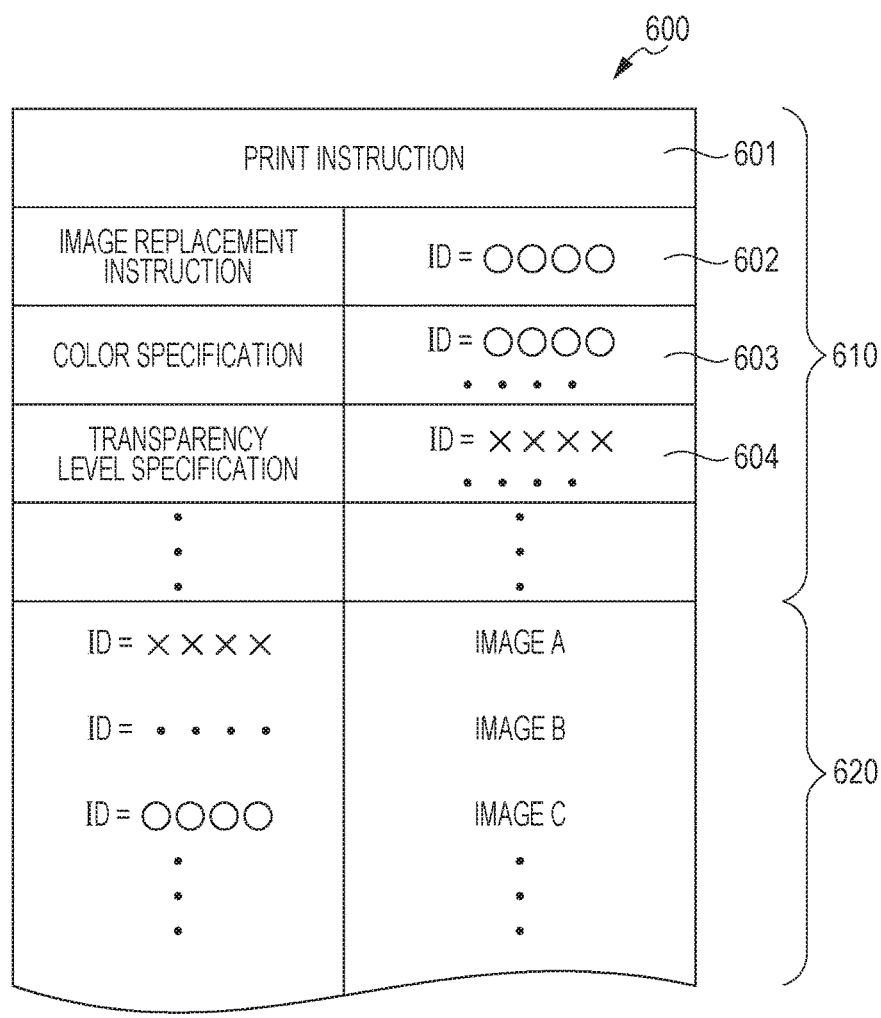
FIG. 4 is a conceptual diagram illustrating a data structure of a received image at an image receiving unit.

FIG. 4 is a conceptual diagram illustrating a data structure of a received image 600 at the image receiving unit 405.

The received image 600 includes attachment information 610 and an image itself 620. The attachment information 610 includes a print instruction 601 indicating that the received image 600 is an image that needs to be printed out, an image replacement instruction 602 specifying an ID of an image and indicating that the image having the ID needs to be replaced, color specification 603 for a texture, and transparency level specification 604 for an image that overlies the texture. The attachment information 610 further includes, for example, the number of sheets to be printed, a duplex printing instruction, a sheet size, and various other types of information; however, illustration and description of these pieces of information will be omitted here.

In addition, the image itself 620 included in the received image 600 includes images A, B, C, and so on as multiple parts that constitute the entire image that needs to be printed out. IDs unique to the respective images A, B, C, and so on are assigned to the respective images A, B, C, and so on. The ID specified by the image replacement instruction 602 of the received image 600 illustrated in FIG. 4 is the ID of the image C. That is, the example illustrated in FIG. 4 indicates that the image C having the same ID as the ID specified by the image replacement instruction 602 is an image that needs to be replaced.

Figure 5:
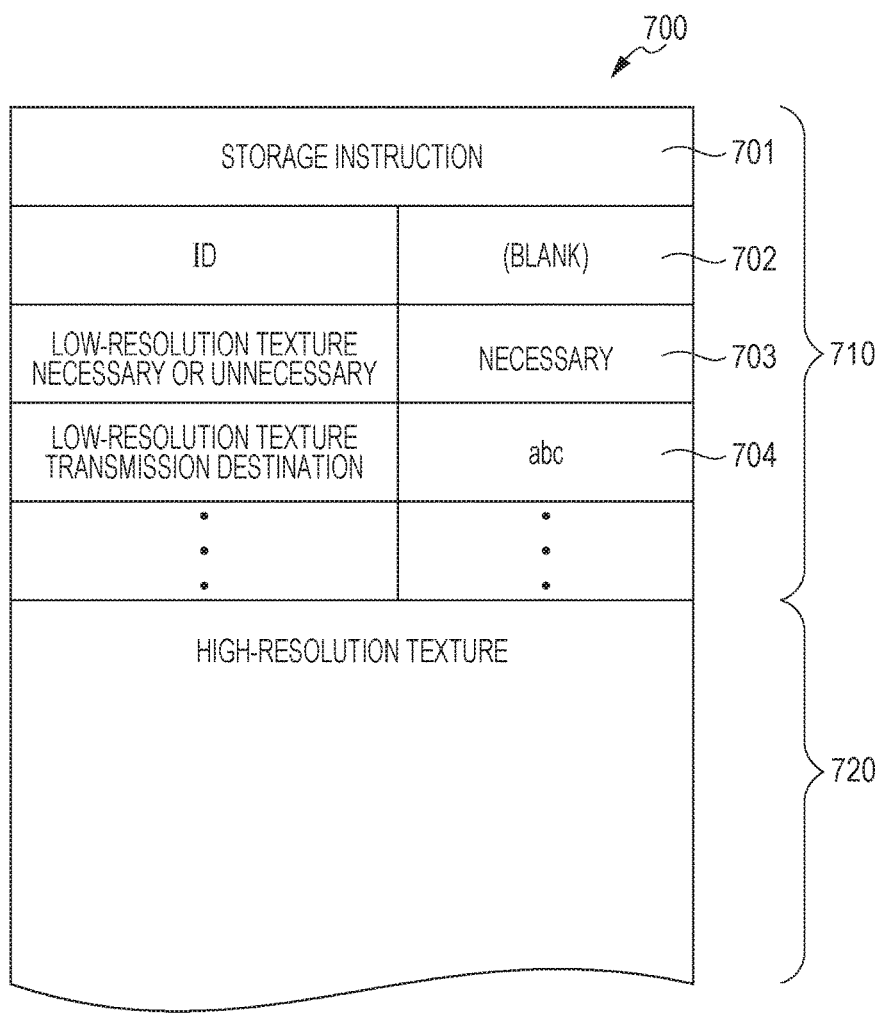
FIG. 5 is a conceptual diagram illustrating a data structure of another received image at the image receiving unit.

FIG. 5 is a conceptual diagram illustrating a data structure of another received image at the image receiving unit 405.

Similarly to the received image 600 illustrated in FIG. 4, a received image 700 illustrated in FIG. 5 includes attachment information 710 and an image itself 720. The attachment information 710 includes a storage instruction 701 indicating that the received image 700 is a high-resolution texture and that the received image 700 needs to be stored in the image memory 403 (see FIG. 3), an ID 702 for the texture, the necessity or unnecessity 703 of generation of a low-resolution texture, a transmission destination 704 of the low-resolution texture, and other information. The example illustrated in FIG. 5 indicates that an ID needs to be assigned since an ID field is blank, that is, an ID has not yet been assigned, and that a low-resolution texture needs to be generated and transmitted to a transmission destination (the working folder 300 illustrated in FIG. 1 in the example described here).

Figure 6:
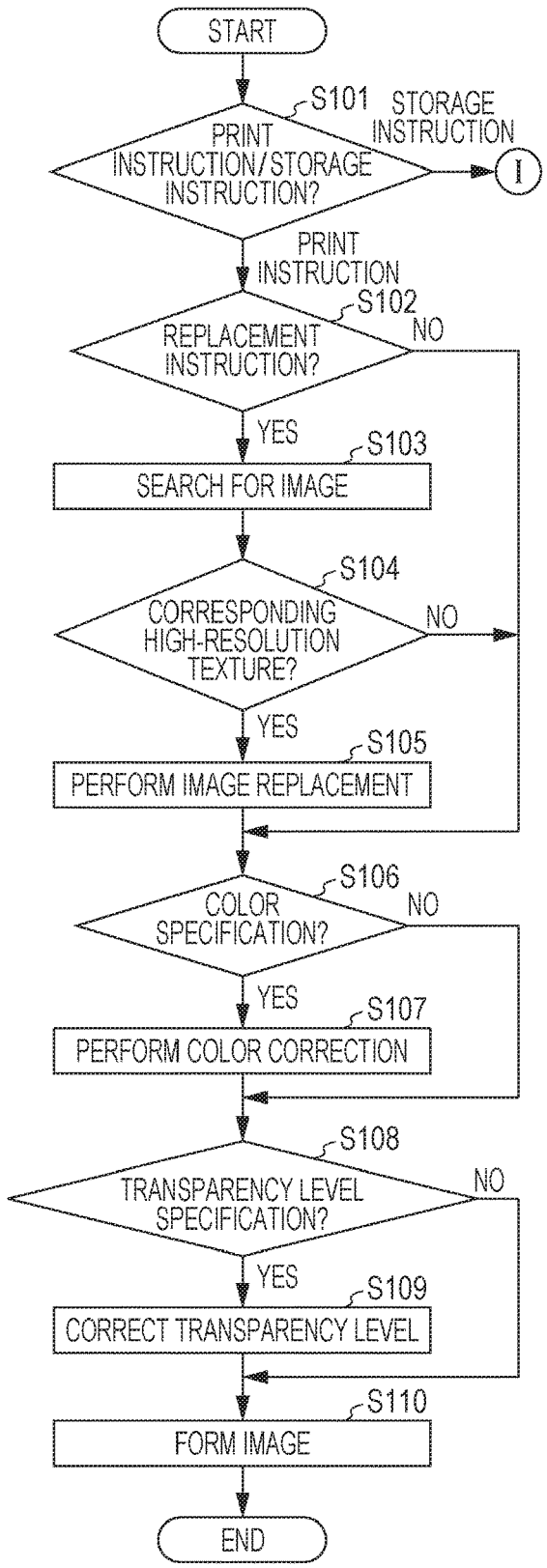
FIG. 6 is a flowchart illustrating an operation executed in the multifunction machine in response to reception of an image, the reception being performed by the image receiving unit.

FIG. 6 is a flowchart illustrating an operation executed in the multifunction machine 400 in response to reception of an image, the reception being performed by the image receiving unit 405.

When the image receiving unit 405 receives an image, it is determined whether the attachment information of the received image includes either the print instruction 601 (see FIG. 4) or the storage instruction 701 (see FIG. 5) (step S101).

Here, first, the case where the attachment information includes the print instruction 601 (see FIG. 4) will be described.

In this case, next, it is determined whether the attachment information includes the image replacement instruction 602 (step S102). In the case where the attachment information includes no image replacement instruction 602, the procedure proceeds to step S106.

In the case where it is determined that the attachment information includes the image replacement instruction 602, a search is performed (step S103) as to whether an image (a high-resolution texture) having the same ID as the ID of the image for which replacement is instructed (the image C in the example illustrated in FIG. 4) is present in the image memory 403. In the case where the image (high-resolution texture) having the same ID is present in the image memory 403 (step S104), image replacement is performed (step S105). In the case where the image having the same ID is absent in the image memory 403 due to some kind of error (step S104), image replacement is not performed.

Next, it is determined whether the attachment information includes the color specification 603 (see FIG. 4) (step S106). In the case where the attachment information includes the color specification 603, color correction is performed (step S107). In the case where the attachment information includes no color specification 603, that is, the image is a black-and-white image, color correction is not performed.

Figure 7:
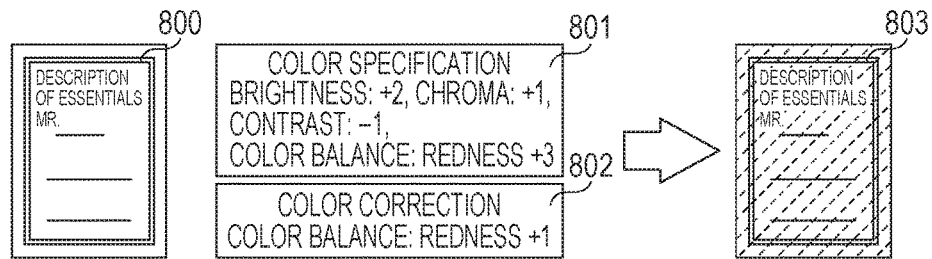
FIG. 7 is a conceptual diagram for color correction.

FIG. 7 is a conceptual diagram for color correction.

Suppose that color specification data 801 illustrated in FIG. 7 is present as a piece of attachment information of a received image 800. In the example illustrated in FIG. 7, "brightness: +2, chroma: +1, contrast: −1, color balance: redness +3" is specified. In addition, "color balance: redness +1" is stored as color correction data 802 in the correction data memory 404. In this case, in the image converter 406, the color specification data 801 is used as is regarding the brightness, chroma, and contrast of the received image 800, the redness is corrected to +4 regarding the color balance of the received image 800, and to-be-output image data for printing out is generated in accordance with the resulting color data. The image forming unit 402 prints out, on a paper sheet, an image based on the to-be-output image data generated in accordance with the resulting color data. In the multifunction machine 400, when a specified color is reflected without being corrected in the to-be-output image data for printing out, the resulting image is an image in which the specified color is not reproduced and whose color is slightly different from the specified color (an image whose redness is slightly insufficient in the example illustrated in FIG. 7). Thus, the color correction data stored in the correction data memory 404 ("color balance: redness +1" in the example illustrated in FIG. 7) is data used for color correction.

The description will continue referring back to FIG. 6.

Next, it is determined whether the attachment information includes the transparency level specification 604 (see FIG. 4) (step S108). In the case where the attachment information includes the transparency level specification 604, the transparency level of an image having an ID recorded there is corrected (step S109). In the case where the attachment information includes no transparency level specification 604, that is, the image (for example, characters) completely and opaquely covers an image (for example, a texture) that is a lower layer of the image, transparency level correction is not performed.

Figure 8:
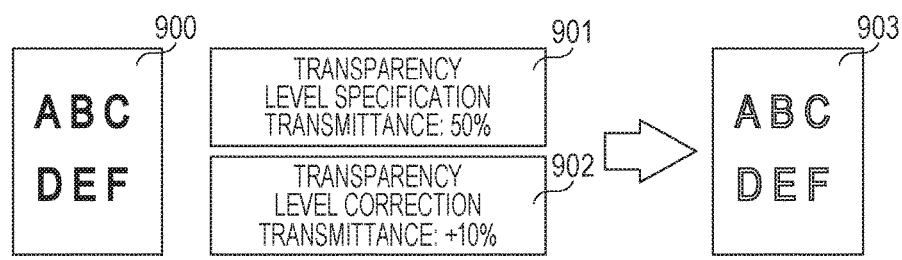
FIG. 8 is a conceptual diagram for transparency-level correction.

FIG. 8 is a conceptual diagram for transparency-level correction.

Suppose that transparency level specification data 901 illustrated in FIG. 8 is included as a piece of attachment information of a received image 900. "Transmittance: 50%" is specified in the example illustrated in FIG. 8. In addition, "transmittance: +10%" is stored as transparency level correction data 802 in the correction data memory 404. In this case, the transmittance data is corrected to 60%, and an image based on to-be-output image data generated in accordance with the resulting transmittance data is printed out on a paper sheet. In the multifunction machine 400, when the specified transmittance is reflected without being corrected in the to-be-output image data for printing out, the resulting image is an image in which the specified transmittance is not achieved and whose transmittance is slightly different from the specified transmittance (an image whose transmittance is slightly insufficient in the example illustrated in FIG. 8). Thus, the transmittance correction data stored in the correction data memory 404 ("transmittance: +10%" in the example illustrated in FIG. 8) is data used for transmittance correction.

The description will continue referring back to FIG. 6 again.

As described above, the image forming unit 402 prints out, on a paper sheet, an image based on to-be-output image data for printing out, the to-be-output image data being generated on the basis of the received-image data acquired as a result of the image replacement, color correction, and transmittance correction performed in accordance with the instructions.

Next, the case where the received image includes the storage instruction 701 (see FIG. 5) will be described.

Figure 9:
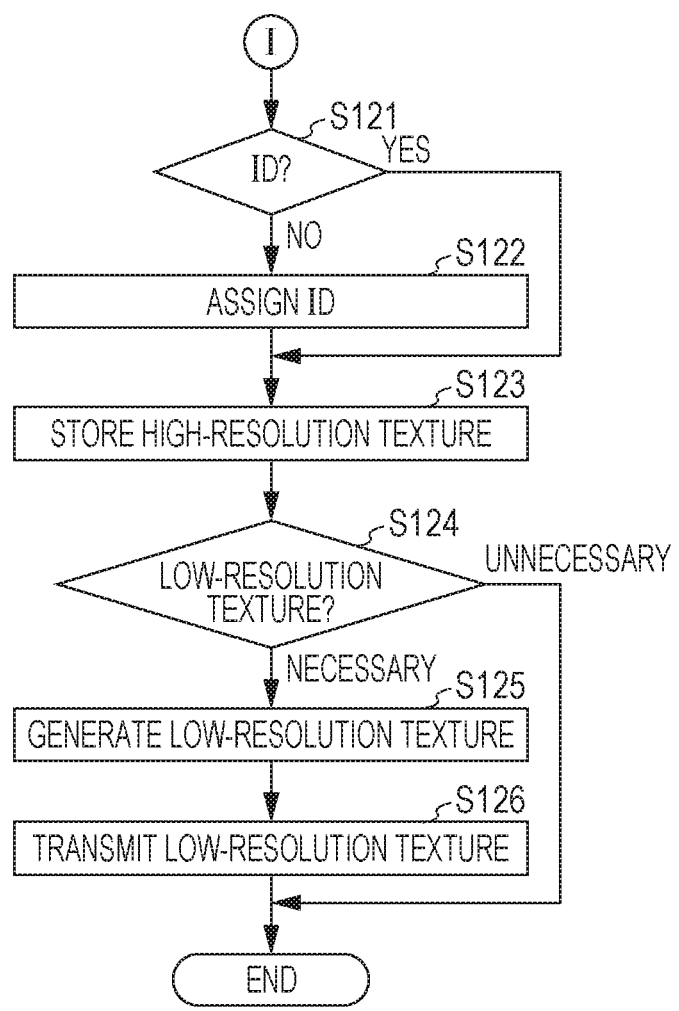
FIG. 9 is a flowchart illustrating an operation executed in the multifunction machine in the case where a received image at the image receiving unit includes a storage instruction.

FIG. 9 is a flowchart illustrating an operation executed in the multifunction machine 400 in the case where the received image at the image receiving unit 405 includes the storage instruction 701.

In step S101 of FIG. 6, in the case where it is determined that the attachment information of the received image includes the storage instruction 701 (see FIG. 5), next, it is determined whether the attachment information of the received image includes the ID 702 (FIG. 9, step S121). In the example of the received image 700 illustrated in FIG. 5, no ID has been assigned yet. In this case, an ID is assigned (step S122). The assigned ID or an ID included in the received image 700 if the ID is included in the received image 700 is associated with the high-resolution texture, and the high-resolution texture is stored in the image memory 403 (see FIG. 3) (step S123).

Next, it is determined whether a low-resolution texture needs to be generated (step S124). The attachment information 710 of the received image 700 illustrated in FIG. 5 indicates that a low-resolution texture needs to be generated. Thus, here, the low-resolution texture is generated (step S125), the ID that is the same as that assigned to the high-resolution texture is assigned to the low-resolution texture, and the low-resolution texture is transmitted toward the transmission destination specified in the attachment information (step S126).

Figure 10:
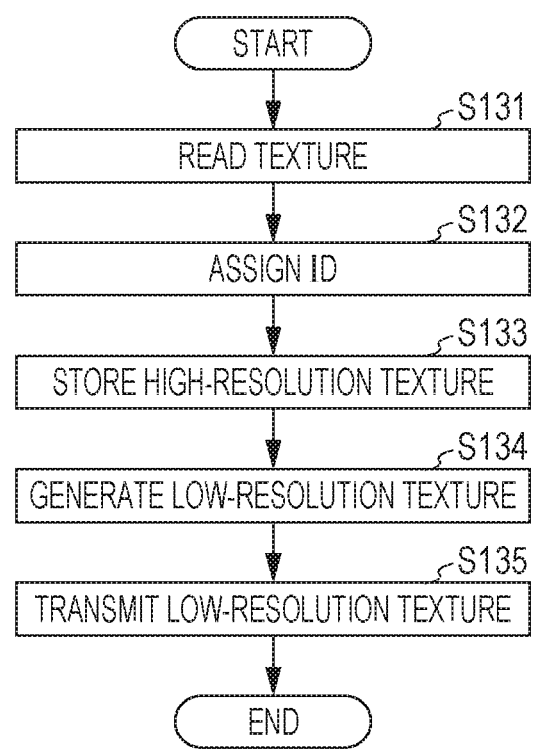
FIG. 10 is a flowchart illustrating an operation executed when a texture is read by an image reading unit of the multifunction machine and stored.

FIG. 10 is a flowchart illustrating an operation executed when a texture is read by the image reading unit 401 of the multifunction machine 400 and stored.

It is instructed to read an image by operating a user interface (UI), not illustrated, of the multifunction machine 400, and to store the read image as a texture. A document on which a texture is drawn or a cloth itself having a texture is set in the image reading unit 401, and a start button is pressed. Execution of the operation according to the flowchart illustrated in FIG. 10 is then started.

Here, the texture is first read (step S131), and an ID is assigned (step S132). In this reading, a high-resolution texture is generated. Thus, the high-resolution texture acquired in the reading is stored in the image memory 403 (see FIG. 3) together with the ID (step S133). Furthermore, a low-resolution texture is generated by performing reduction processing on the high-resolution texture (step S134). The low-resolution texture is transmitted together with the ID toward a preregistered transmission destination or a transmission destination (the working folder 300 in the example illustrated in FIG. 1) specified by a user operating the UI (step S135).

The description of the exemplary embodiment of the present invention ends here. Next, modifications of the exemplary embodiment will be described.

FIG. 11 is a conceptual diagram illustrating a data structure of high-resolution textures stored in the image memory 403 according to a first modification. FIG. 11 is a diagram corresponding to FIG. 3 for the exemplary embodiment described above.

No IDs are assigned to low-resolution textures and high-resolution textures in the example illustrated in FIG. 11, and each low-resolution texture and a corresponding one of the high-resolution textures are paired and stored in the image memory 403.

In the case of the first modification, when the received image 600 (see FIG. 4) includes an image replacement instruction, the low-resolution texture that needs to be replaced in the received image 600 is compared with the low-resolution textures stored in the image memory 403, and a search for a low-resolution texture the same as the low-resolution texture that needs to be replaced in the received image 600 is performed. In the case where a low-resolution texture the same as the low-resolution texture that needs to be replaced in the received image 600 is present in the image memory 403, the high-resolution texture with which the low-resolution texture is paired is read out, and the low-resolution texture that needs to be replaced in the received image 600 is replaced with the read-out high-resolution texture.

In this manner, the low-resolution textures and the high-resolution textures may be stored in the image memory 403 such that, instead of IDs, the low-resolution textures are associated with the high-resolution textures.

Figure 12:
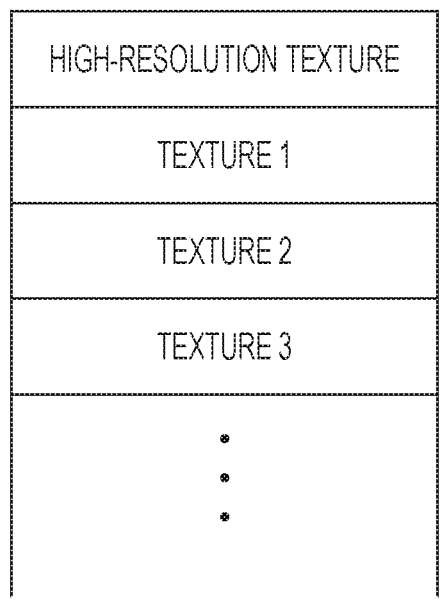
FIG. 12 is a conceptual diagram illustrating a data structure of high-resolution textures stored in the image memory according to a second modification.

FIG. 12 is a conceptual diagram illustrating a data structure of high-resolution textures stored in the image memory 403 according to a second modification. FIG. 12 is a diagram also corresponding to FIG. 3 for the exemplary embodiment described above.

In the example illustrated in FIG. 12, high-resolution textures are not associated with IDs or low-resolution textures, and only the high-resolution textures are stored in the image memory 403.

In the case of the second modification, when the received image 600 (see FIG. 4) includes an image replacement instruction, low-resolution textures are generated from the high-resolution textures stored in the image memory 403, the generated low-resolution textures are compared with the low-resolution texture that needs to be replaced in the received image 600, and a search for a high-resolution texture corresponding to the low-resolution texture that needs to be replaced in the received image 600 is performed. In the case where the high-resolution texture corresponding to the low-resolution texture that needs to be replaced in the received image 600 is present in the image memory 403, the high-resolution texture is read out from the image memory 403, and the low-resolution texture that needs to be replaced in the received image 600 is replaced with the read-out high-resolution texture.

In this manner, only the high-resolution textures that are not associated with IDs or low-resolution textures may be stored in the image memory 403.

Note that the image handling system 10 and the multi-function machine 400 illustrated in FIG. 1 are mere examples, and the exemplary embodiment of the present invention is applicable to various systems that edit and print out images and various image printing-out devices.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an image memory configured to store replacement image data representing a replacement image;
at least one processor configured to execute:
an image receiving unit that receives image data transmitted from outside the image forming apparatus;
an image determination unit that determines whether the received-image data received by the image receiving unit includes to-be-replaced image data representing a to-be-replaced image that needs to be replaced;
an image search unit that searches, in a case where the image determination unit determines that the received-image data includes the to-be-replaced image data, the replacement image data stored in the image memory for replacement image data corresponding to the to-be-replaced image data;
an image forming unit that forms, on a paper sheet, an image using image data; and
an image converter that converts, in a case where the replacement image data corresponding to the to-be-replaced image data included in the received-image data is detected by the image search unit, the received-image data into to-be-output image data in which the to-be-replaced image data is replaced with the replacement image data corresponding to the to-be-replaced image data, and causes the image forming unit to form an image using the to-be-output image data.

2. The image forming apparatus according to claim 1, wherein the at least one processor is further configured to execute:
an image reading unit that reads a replacement image and generates replacement image data representing the replacement image;
an image storage unit that stores, in the image memory, the replacement image data generated by the image reading unit;
an image generation unit that generates, using the replacement image data generated by the image reading unit, to-be-replaced image data corresponding to the replacement image data; and
an image transmitting unit that transmits the to-be-replaced image data generated by the image generation unit outside of the image forming apparatus.

3. The image forming apparatus according to claim 1, wherein the image receiving unit further receives replacement image data generated outside the image forming apparatus, and wherein the at least one processor is further configured to execute an image storage unit that stores, in the image memory, the replacement image data received by the image receiving unit.

4. The image forming apparatus according to claim 2, wherein the image receiving unit further receives replacement image data generated outside the image forming apparatus, and
wherein the image storage unit also stores, in the image memory, the replacement image data received by the image receiving unit.

5. The image forming apparatus according to claim 3, wherein the at least one processor is further configured to execute:
an image generation unit that generates, using the replacement image data received by the image receiving unit, to-be-replaced image data corresponding to the replacement image data; and
an image transmitting unit that transmits the to-be-replaced image data generated by the image generation unit outside of the image forming apparatus.

6. The image forming apparatus according to claim 4, wherein the image generation unit also generates, using the replacement image data received by the image receiving unit, to-be-replaced image data corresponding to the replacement image data; and
wherein the image transmitting unit also transmits the to-be-replaced image data generated by the image generation unit outside of the image forming apparatus.

7. The image forming apparatus according to claim 1, wherein the image search unit searches the replacement image data stored in the image memory for replacement image data to which an ID corresponding to an ID assigned to the to-be-replaced image data is assigned.

8. The image forming apparatus according to claim 2, wherein the image search unit searches the replacement image data stored in the image memory for replacement image data to which an ID corresponding to an ID assigned to the to-be-replaced image data is assigned.

9. The image forming apparatus according to claim 1, wherein
the image memory stores both the replacement image data and the to-be-replaced image data such that the replacement image data and the to-be-replaced image data are associated with each other, and
the image search unit searches for replacement image data corresponding to the to-be-replaced image data included in the received-image data, by comparing the to-be-replaced image data included in the received-image data with the to-be-replaced image data stored in the image memory, and by searching the to-be-replaced image data stored in the image memory for to-be-replaced image data matching the to-be-replaced image data included in the received-image data.

10. The image forming apparatus according to claim 2, wherein
the image memory stores both the replacement image data and the to-be-replaced image data such that the replacement image data and the to-be-replaced image data are associated with each other, and
the image search unit searches for replacement image data corresponding to the to-be-replaced image data included in the received-image data, by comparing the to-be-replaced image data included in the received-image data with the to-be-replaced image data stored in the image memory, and by searching the to-be-replaced image data stored in the image memory for to-be-replaced image data matching the to-be-replaced image data included in the received-image data.

11. The image forming apparatus according to claim 1, wherein the image search unit compares the to-be-replaced image data with the replacement image data stored in the image memory, and searches the replacement image data stored in the image memory for replacement image data corresponding to the to-be-replaced image data.

12. The image forming apparatus according to claim 2, wherein the image search unit compares the to-be-replaced image data with the replacement image data stored in the image memory, and searches the replacement image data stored in the image memory for replacement image data corresponding to the to-be-replaced image data.

13. The image forming apparatus according to claim 1, wherein the replacement image data is image data representing an image having a relatively high resolution, the to-be-replaced image data is image data representing an image having a relatively low resolution, and the image represented by the to-be-replaced image data is the same as the image represented by the replacement image data corresponding to the to-be-replaced image data except for resolutions of the images.

14. The image forming apparatus according to claim 2, wherein the replacement image data is image data representing an image having a relatively high resolution, the to-be-replaced image data is image data representing an image having a relatively low resolution, and the image represented by the to-be-replaced image data is the same as the image represented by the replacement image data corresponding to the to-be-replaced image data except for resolutions of the images.

15. The image forming apparatus according to claim 1, wherein the to-be-replaced image data is image data that has image data with no color information and has color specification data representing a color of the image data,
the image forming apparatus further comprising a correction data memory that stores color correction data,
wherein the image converter converts the received-image data into to-be-output image data including color information acquired as a result of correction in which the color specification data is corrected using the color correction data stored in the correction data memory, and causes the image forming unit to form an image using the to-be-output image data including the color information acquired as a result of the correction.

16. The image forming apparatus according to claim 2, wherein the to-be-replaced image data is image data that has image data with no color information and has color specification data representing a color of the image data,
the image forming apparatus further comprising a correction data memory that stores color correction data,
wherein the image converter converts the received-image data into to-be-output image data including color information acquired as a result of correction in which the color specification data is corrected using the color correction data stored in the correction data memory, and causes the image forming unit to form an image using the to-be-output image data including the color information acquired as a result of the correction.

17. The image forming apparatus according to claim 1, wherein the received-image data is image data that has image data with no transparency level information and has transparency level specification data representing a transparency level, wherein the image forming apparatus further comprises a correction data memory configured to store transparency level correction data, and wherein the image converter converts the received-image data into to-be-output image data including transparency level information acquired as a result of correction in which the transparency level specification data is corrected using the transparency level correction data stored in the correction data memory, and causes the image forming unit to form an image using the to-be-output image data including the transparency level information acquired as a result of the correction.

18. The image forming apparatus according to claim 2, wherein the received-image data is image data that has image data with no transparency level information and has transparency level specification data representing a transparency level, wherein the image forming apparatus further comprises a correction data memory configured to store transparency level correction data, and wherein the image converter converts the received-image data into to-be-output image data including transparency level information acquired as a result of correction in which the transparency level specification data is corrected using the transparency level correction data stored in the correction data memory, and causes the image forming unit to form an image using the to-be-output image data including the transparency level information acquired as a result of the correction.

19. An image forming system comprising:
the image forming apparatus according to claim 1; and
an image editing apparatus that is connected to the image forming apparatus via a communication line, wherein the image editing apparatus is configured to generate image data including the to-be-replaced image data by performing image editing using the to-be-replaced image data, and wherein the image editing apparatus is configured to transmit the image data to the image forming apparatus.

20. A non-transitory computer readable medium storing a program causing a computer to execute a process, the process comprising:

storing replacement image data representing a replacement image;

receiving image data transmitted from outside an image forming apparatus;

determining whether the received-image data includes to-be-replaced image data representing a to-be-replaced image;

searching, in a case where it is determined that the received-image data includes the to-be-replaced image data, the stored replacement image data for replacement image data corresponding to the to-be-replaced image data;

forming, on a paper sheet, an image using image data;

converting, in a case where the replacement image data corresponding to the to-be-replaced image data included in the received-image data is detected, the received-image data into to-be-output image data in which the to-be-replaced image data is replaced with the replacement image data corresponding to the to-be-replaced image data; and forming an image using the to-be-output image data.

* * * * *